(12) United States Patent
Leroy et al.

(10) Patent No.: US 10,414,119 B2
(45) Date of Patent: Sep. 17, 2019

(54) COMPOSITE PANEL WITH THERMOSETTING CELLULAR MATRIX, MANUFACTURING METHOD, AND STRUCTURE FOR COVERING A WALL FORMED FROM AN ASSEMBLY OF PANELS

(71) Applicant: HUTCHINSON, Paris (FR)

(72) Inventors: Fabien Leroy, Lorris (FR); Jérôme Maugey, Chambray les Tours (FR); Gérard Bou, Nancy (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 15/525,985

(22) PCT Filed: Nov. 6, 2015

(86) PCT No.: PCT/IB2015/058584
§ 371 (c)(1),
(2) Date: Oct. 3, 2017

(87) PCT Pub. No.: WO2016/075602
PCT Pub. Date: May 19, 2016

(65) Prior Publication Data
US 2018/0126690 A1      May 10, 2018

(30) Foreign Application Priority Data

Nov. 14, 2014    (FR) ..................... 14 61005

(51) Int. Cl.
*B32B 38/08*         (2006.01)
*B32B 5/02*          (2006.01)
(Continued)

(52) U.S. Cl.
CPC ............... *B32B 5/022* (2013.01); *B32B 5/06* (2013.01); *B32B 5/12* (2013.01); *B32B 5/20* (2013.01);
(Continued)

(58) Field of Classification Search
CPC ............ E04C 5/073; E04C 3/20; B28B 23/18
See application file for complete search history.

(56) References Cited

U.S. PATENT DOCUMENTS 3,808,085 A * 4/1974 Givens, Jr. .............. E01C 11/18
                                                       52/340
4,033,781 A * 7/1977 Hauser ...................... B28B 1/52
                                                       106/711

(Continued)

FOREIGN PATENT DOCUMENTS

| DE | 102012106083 | * | 7/2012 |
| EP | 2801477 A1 | | 11/2014 |
| WO | 2011101343 A1 | | 8/2011 |
| WO | 2014009381 A1 | | 1/2014 |

*Primary Examiner* — Gisele D Ford
(74) *Attorney, Agent, or Firm* — Browdy and Neimark, PLLC

(57) ABSTRACT

A composite panel with a thermosetting cellular matrix, a method for manufacturing said panel, and a structure for covering a wall that is formed from an assembly of such panels. The structure provides the wall with heat insulation against cryogenic fluids and/or protection against fire or flames and/or sealing against the fluids. A panel having a thermosetting cellular matrix, includes at least one substrate that includes short, non-woven basalt fibers and is impregnated by the matrix. The panel is such that the at least one substrate includes a plurality of non-woven layers stacked to a stacking thickness. The non-woven layers each include the short basalt fibers and are needled through the thickness without using thermoplastic fibers.

24 Claims, 3 Drawing Sheets

Figure 1:
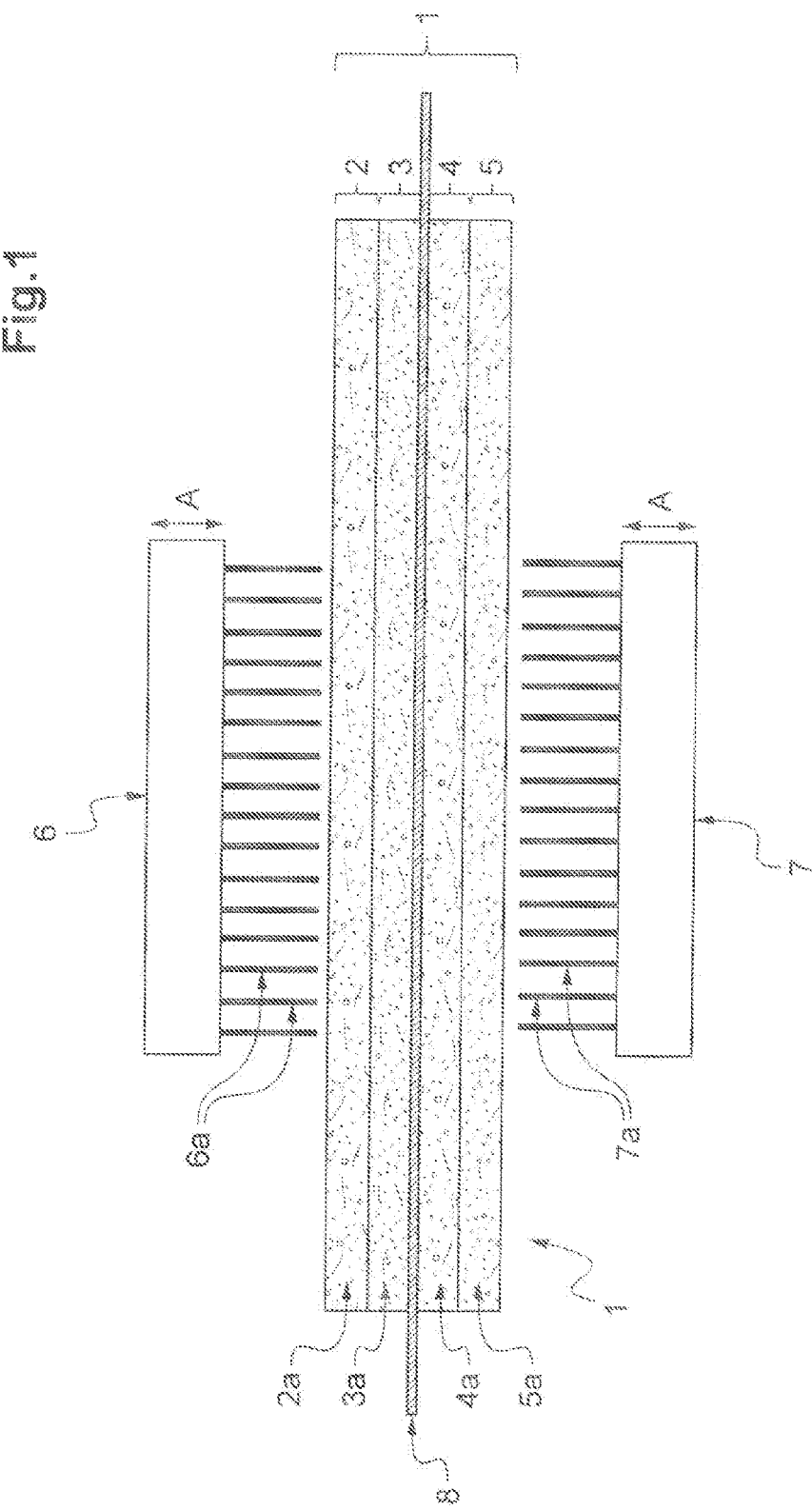

(51) Int. Cl.
  *B32B 5/06* (2006.01)
  *B32B 5/12* (2006.01)
  *B32B 5/20* (2006.01)
  *B32B 5/26* (2006.01)
  *B32B 15/14* (2006.01)
  *B32B 15/20* (2006.01)
  *B32B 25/08* (2006.01)
  *B32B 25/10* (2006.01)
  *D04H 1/48* (2012.01)
  *D04H 1/488* (2012.01)
  *D04H 1/498* (2012.01)
  *D04H 1/64* (2012.01)
  *D04H 1/68* (2012.01)
  *D04H 5/02* (2012.01)
  *D04H 5/04* (2006.01)
  *D04H 1/4209* (2012.01)
  *D04H 1/587* (2012.01)
  *B32B 7/08* (2019.01)

(52) U.S. Cl.
  CPC ........... *B32B 5/26* (2013.01); *B32B 7/08* (2013.01); *B32B 15/14* (2013.01); *B32B 15/20* (2013.01); *B32B 25/08* (2013.01); *B32B 25/10* (2013.01); *D04H 1/4209* (2013.01); *D04H 1/48* (2013.01); *D04H 1/488* (2013.01); *D04H 1/498* (2013.01); *D04H 1/587* (2013.01); *D04H 1/64* (2013.01); *D04H 1/68* (2013.01); *D04H 5/02* (2013.01); *D04H 5/04* (2013.01); *B32B 2255/02* (2013.01); *B32B 2255/26* (2013.01); *B32B 2260/023* (2013.01); *B32B 2260/046* (2013.01); *B32B 2262/10* (2013.01); *B32B 2266/0285* (2013.01); *B32B 2266/06* (2013.01); *B32B 2305/20* (2013.01); *B32B 2307/306* (2013.01); *B32B 2307/3065* (2013.01); *B32B 2307/718* (2013.01); *B32B 2307/72* (2013.01); *B32B 2307/7265* (2013.01); *B32B 2605/00* (2013.01); *B32B 2605/12* (2013.01); *B32B 2605/18* (2013.01); *B32B 2607/00* (2013.01)

(56) References Cited

U.S. PATENT DOCUMENTS

| | | | | |
|---|---|---|---|---|
| 4,257,993 A * | 3/1981 | Schemel | B28B 23/0006 | 264/112 |
| 4,265,979 A * | 5/1981 | Baehr | B28B 1/521 | 156/39 |
| 4,432,825 A * | 2/1984 | Andersson | B32B 5/18 | 156/307.3 |
| 5,164,260 A * | 11/1992 | Yoshinaka | C04B 14/005 | 181/284 |
| 5,458,970 A * | 10/1995 | Fujishiro | C04B 20/0052 | 264/45.1 |
| 5,891,560 A * | 4/1999 | Edwards | B29B 15/122 | 427/434.6 |
| 5,935,879 A * | 8/1999 | Helwig | B29C 63/044 | 442/59 |
| 5,981,630 A * | 11/1999 | Banthia | E04C 5/073 | 106/703 |
| 6,189,286 B1 * | 2/2001 | Seible | E04C 3/20 | 52/834 |
| 6,197,423 B1 * | 3/2001 | Rieder | B29C 70/10 | 428/397 |
| 6,346,325 B1 * | 2/2002 | Edwards | B29C 47/02 | 264/210.1 |
| 6,613,424 B1 * | 9/2003 | Putt | B32B 13/04 | 428/312.4 |
| 6,706,147 B2 * | 3/2004 | Peng | B32B 17/067 | 162/157.1 |
| 7,049,251 B2 * | 5/2006 | Porter | B28B 19/0092 | 428/911 |
| 7,396,403 B1 * | 7/2008 | Ogden | C04B 20/1033 | 106/714 |
| 7,553,780 B2 * | 6/2009 | Smith | B32B 13/14 | 442/131 |
| 2001/0049399 A1 * | 12/2001 | Edwards | E04C 5/073 | 521/101 |
| 2001/0051266 A1 * | 12/2001 | Rieder | B29C 70/10 | 428/373 |
| 2002/0090871 A1 * | 7/2002 | Ritchie | E04C 2/043 | 442/42 |
| 2003/0154683 A1 * | 8/2003 | Bache | E04C 3/22 | 52/586.1 |
| 2003/0188667 A1 * | 10/2003 | Beard | C04B 20/0048 | 106/644 |
| 2004/0065044 A1 * | 4/2004 | Bleibler | B29C 53/14 | 52/649.1 |
| 2004/0177579 A1 * | 9/2004 | Tremelling | E04B 2/8617 | 52/426 |
| 2004/0209074 A1 * | 10/2004 | Randall | B28B 19/0092 | 428/341 |
| 2004/0244653 A1 * | 12/2004 | Schmidt | C04B 28/02 | 106/802 |
| 2006/0014878 A1 * | 1/2006 | Van Erp | B28B 1/008 | 524/442 |
| 2009/0169885 A1 * | 7/2009 | Carter | C04B 16/0633 | 428/399 |
| 2009/0208714 A1 * | 8/2009 | Currier | B28B 1/52 | 428/212 |
| 2009/0226693 A1 * | 9/2009 | Carter | C04B 16/0633 | 428/294.7 |
| 2012/0077397 A1 * | 3/2012 | Porter | D01D 11/06 | 442/51 |
| 2012/0110940 A1 * | 5/2012 | Hemphill | E04G 23/0218 | 52/514 |
| 2013/0216802 A1 * | 8/2013 | Leung | C04B 28/02 | 428/215 |
| 2013/0239503 A1 * | 9/2013 | Miller | C04B 20/0068 | 52/414 |
| 2013/0316104 A1 * | 11/2013 | Adam | B28B 13/021 | 428/34.5 |
| 2014/0011030 A1 * | 1/2014 | Kawakami | C04B 20/0068 | 428/394 |
| 2014/0013692 A1 * | 1/2014 | Al-Shannag | E04C 5/073 | 52/309.17 |
| 2014/0060392 A1 * | 3/2014 | Koenigstein | C04B 20/0068 | 106/802 |
| 2014/0099456 A1 * | 4/2014 | Raghavendran | E04C 5/07 | 428/34.4 |
| 2014/0109510 A1 * | 4/2014 | Morris | B32B 18/00 | 52/831 |
| 2015/0050440 A1 * | 2/2015 | Albers | D03D 1/00 | 428/36.1 |
| 2015/0099078 A1 * | 4/2015 | Fish | C08L 83/16 | 428/36.4 |
| 2015/0166744 A1 * | 6/2015 | Hannen | C08J 5/043 | 264/40.1 |
| 2015/0167302 A1 * | 6/2015 | Stempniewski | E04C 5/07 | 442/60 |
| 2015/0204075 A1 * | 7/2015 | Tsukamoto | B29C 35/0805 | 52/309.1 |
| 2015/0240492 A1 * | 8/2015 | Teng | E04C 5/073 | 442/327 |
| 2016/0076249 A1 * | 3/2016 | Gibson | B29C 70/521 | 52/834 |
| 2016/0265228 A1 * | 9/2016 | Smith | E04C 5/073 | |
| 2018/0195285 A1 * | 7/2018 | Smith | B29C 70/20 | |

\* cited by examiner

COMPOSITE PANEL WITH THERMOSETTING CELLULAR MATRIX, MANUFACTURING METHOD, AND STRUCTURE FOR COVERING A WALL FORMED FROM AN ASSEMBLY OF PANELS

The present invention relates to a composite panel with a cellular thermosetting matrix, to a method for manufacturing this panel and to a coating structure of a wall which is formed with an assembly of such panels and imparts to the wall thermal insulation with regard to cryogenic fluids and/or a protection against fire and flames and/or a seal to these fluids. The invention in particular applies to such a structure for coating a platform, a bridge or a hull of an offshore liquefied gas production floating unit, and more generally to any application for example in the aeronautical field requiring at least one of the three aforementioned thermal insulation, protection and seal properties.

In a known way, protection against leaks or accidental pourings of cryogenic liquids (i.e. liquefied gases for which the temperature in the liquid state is less than −150° C. such as for example liquefied petroleum gas called LPGs, or liquefied natural gas) notably during pumping operations, treatment operations such as separations, liquefaction, storage and applied transfer of these liquids. Actually, it is known that flows of cryogenic liquids may damage structures typically in steel used in bridges and hulls of platforms or of ships by fragile failure. This is the reason why structures for coating substrates of the bridges and of the hulls have been developed in the past protecting these substrates from the flows of these liquids, both from the point of view of thermal insulation (in order to avoid a critical cooling of the substrates) and from the seal to said liquids.

It is also sought to impart to the substrates of these bridges and hulls satisfactory resistant to fire, including reduced flammability, resistance to the propagation of flames, reduced emissivity of fumes and thermal insulation (in order to avoid a critical heating up of these substrates).

It is thus known how to use protective coating structures as an assembly of panels forming a paving on these substrates, these panels for example consisting of:

a cell composition of the syntactic foam type based on a polymeric matrix and on injected hollow microspheres, with as main drawbacks, a seal to cryogenic fluids and mechanical strength which are both insufficient, of a compact plastic composition of the thermosetting type, with as drawbacks, constraining geometrical modularity, too large weight and a too high cost, or of a fiber composite with a cellular thermosetting matrix as notably described in the document receiving comments hereafter.

This document WO-A1-2014/009381 has a composite panel with an expansed thermosetting matrix comprising a support in natural fibers impregnated by this matrix which is based on a resin in an aqueous base and on an expansion agent. The support is formed with a felt which is shown as comprising preferably short basalt fibers, it being specified that the description of the unique example of a panel manufactured mentions the use of fibers not short but on the contrary continuous filaments of the "BCF" type (i.e. "Basalt Continuous Filaments"). According to this document, this felt is necessarily needled on both of its surfaces by providing a thermoplastic complementary fiber in polyethylene.

A major drawback of the panel shown in this document lies in this provision of polyethylene fibers which is required for imparting satisfactory integrity to the felt for basis weight of the latter specifically comprised between 480 and 780 g/m².

However, it is possible to believe that this provision of polyethylene fibers during the needling of the felt at the surface does not significantly improve its mechanical properties, on the contrary being able to generate a lack of homogeneity in the felt expressed by its locally variable surface mass which, in fields like aeronautics, poses problems.

Further, during the heating of the fiber support by means of a heating press during the third step for cross-linking and expansion of the thermosetting resin described in this document, a heating temperature comprised between 90 and 150° C. and preferably between 135 and 145° C. is used for allowing both activation of the expansion agent and the cross-linking of the resin. However, this heating temperature may negatively interfere with the provided polyethylene fibers during the previous needling, because it is located in the usual range of melting temperatures of polyethylene (from 85 to 140° C.) which may make these polyethylene fibers totally unnecessary and cause accumulations of molten polyethylene in certain areas of the panel.

In addition to the aforementioned drawbacks of the panel according to this document which are directly related to the needling of the support with these polyethylene fibers, it appears that the mechanical properties of the tested panel were only improved relatively, taking into account the high thickness obtained for the panel in connection with its specific gravity.

An object of the present invention is to propose a composite panel with a cellular thermosetting matrix, the panel comprising at least one support which comprises short non-woven basalt fibers and which is impregnated with said matrix, which is a remedy to the aforementioned drawbacks.

For this purpose, a panel according to the invention is such that said at least one support comprises several superposed non-woven fabrics along a superposition thickness, said non-woven fabrics each comprising said short basalt fibers and being needled in said thickness without providing any thermoplastic fibers.

By «non-woven» is meant in a known way in the present description, a manufactured sheet consisting of a web, of a layer, of a felt or of a mattress of oriented fibers in a particular or random direction, bound by friction and/or cohesion and/or adhesion, excluding paper and products obtained by weaving, knitting, tufting or sewing.

By «needled» non-woven fabrics are meant in an also known way their mechanical consolidation by the needling technique, which has the effect of generating vertical fiber bridges between the different sheets in order to maintain them together. For this reason, the needling can only be applied to fibers with a sufficient length, typically of at least 30 mm and in general of at least 40 mm, as this is the case of the short basalt fibers used in these non-woven fabrics.

It will be noted that this panel of the invention is thus characterized by the stack of several non-woven layers, such as felts for example, which comprise these short basalt fibers preferably in a majority or exclusively (i.e., according to a mass fraction greater than 50% and even more preferentially greater than 90%, optionally 100%).

According to another characteristic of the invention, said short basalt fibers included in or making up each non-woven may have an average diameter comprised between 13 μm and 16 μm and an average length comprised between 30 mm and 60 mm and preferably between 35 mm and 45 mm, it being specified that these short basalt fibers used in the present invention may be classified as a limit in the «TBF» («Thin Staple Basalt Fibers»), so that their average diameter is slightly greater than that of the «TBF» fibers available commercially which is usually comprised between 6 µm and 12 µm.

It will be noted that these basalt fibers of the «TBF» type which may be used in the non-woven fabrics of the present invention notably have the advantage of resisting to temperatures ranging up to 1040° C. without being altered. It will also be noted that they cannot be used as short basalt fibers in the non-woven fabrics of a panel according to the invention:

the basalt fibers of the «BCF» («Basalt Continuous Fibers») type, i.e. continuous fibers with an average diameter usually comprised between 6 µm and 21 µm and with a very high average length typically comprised between 40 km and 60 km, because these "BCF" fibers do not give sufficient mechanical strength to the superposed non-woven fabrics and require, as explained in the aforementioned document WO-A1-2014/009381, the provision of needled fibers in polyethylene, neither the basal fibers of the "STBF" ("Super Thin Basalt Fibers") type with a diameter usually comprised between 1 µm and 3 µm and with an average length typically close to 50 mm, because these fibers of very small diameter do not hook-up sufficiently with each other in order to obtain a non-woven of the felt type and are further noxious for health.

Further it will be noted that these non-woven fabrics according to the invention have the structural particularity of being needled together and in depth through this stack and without any supply of any thermoplastic fiber during the needling, unlike the aforementioned document WO-A1-2014/009381 which teaches a needling of both surfaces of a single felt with provision of thermoplastic fibers in polyethylene. This needling in depth of the non-woven fabrics according to the invention without providing any thermoplastic material (e.g. without any provision of polyolefin such as polyethylene or of any other themoplastic polymer) gives the possibility of obtaining satisfactory mechanical strength of the non-woven fabrics by connecting them together while finding a remedy to the aforementioned drawback of this document inherent to the use of polyolefinic needling fibers which may melt during the expansion/cross-linking of the thermosetting matrix.

Advantageously, said several superposed non-woven fabrics may comprise at least three and preferably four said non-woven fabrics.

According to a first embodiment of the invention, these superposed non-woven fabrics are needled with provision of continuous basalt fibers.

According to this first embodiment, said continuous basalt fibers may form parallel warp yarns inserted in said superposed non-woven fabrics, said warp yarns being spaced apart two by two between them by a distance preferably comprised between 10 cm and 40 cm and, still more preferentially, comprised between 15 cm and 25 cm.

Advantageously, these continuous basalt fibers may have a linear mass comprised between 100 tex and 300 tex, preferably between 180 nd 230 tex, and preferably fit the name of "BCF".

It will be noted that these continuous basalt fibers give the possibility of improving the resistance of said support in the direction of the length (i.e. the direction of the warp yarns).

Also according to this first embodiment, said superposed non-woven fabrics may each consist (i.e. exclusively) of short basalt fibers and of these continuous basalt fibers, and may each have a surface mass comprised between 480 and 2,000 g/m$^2$.

According to a second embodiment of the invention, said superposed non-woven fabrics each have a surface mass greater than a 1,000 g/m$^2$ and are needled without providing any fibers.

According to this second embodiment, said superposed non-woven fabrics may thus each consist (i.e. exclusively) of said short basalt fibers.

Advantageously, said at least one support impregnated by said thermosetting matrix may comprise said superposed non-woven fabrics according to a mass fraction comprised between 15 and 25% and said matrix according to a mass fraction comprised between 75 and 85%.

Also advantageously, the thermosetting matrix may comprise (in mass fractions):

between 50 and 65% of a resin in an aqueous base selected from the group formed by melamine-formaldehyde resins, phenolic resins and wood glues and preferably melamine-formaldehyde;

between 3 and 15% of an expansion agent for forming open cells which preferably comprise isobutane (for pressing temperatures of less than 150° C. or of isopentane (for pressing temperatures greater than 150° C.);

between 0.5 and 2% of a catalyst preferably comprising an amine hydrochloride;

between 30 and 45% of an aqueous solvent such as water; and between 0 and 3% of optional additives such as milled carbon or graphite, for example.

According to another characteristic of the invention, said superposed non-woven fabrics and impregnated with said thermosetting matrix may have a specific gravity comprised between 60 kg/m$^3$ and 1,200 kg/m$^3$ and a thickness comprised between 5 mm and 30 mm.

Advantageously, said panel may further comprise:

at least one aluminium sheet located on the outside of said superposed non-woven fabrics of said at least one support, for example located between two said supports each consisting of said superposed non-woven fabrics, and/or an external layer forming a protective coating of the panel which is selected from the group formed by rubbers, thermoplastic elastomers, epoxy paints and polyurethanes.

It will be noted that this external layer is for example intended to form an upper layer of a coating structure of a wall or substrate according to the invention defining the external surface of a floor, platform, bridge or hull on which operators may move.

Advantageously, said panel may have:

a thermal conductivity at 25° C. of less than or equal to 50 mW·m$^{-1}$K$^{-1}$ (advantageously 35 mW·m$^{-1}$K$^{-1}$), notably giving it good heat insulation to cryogenic fluids so that the temperature of the underlying substrate is not lower than −60° C., and/or a seal to cryogenic fluids giving the possibility of avoiding any contact of these fluids with the underlying substrate, and/or a passive resistance to fire including:
 an inflammability of class CFL-S1, according to the NF EN 13501-1 standard,
 a resistance to flame propagation of less than 25, measured according to the ASTM E84 standard,
 an emissivity index of fumes of less than 130, measured according to the ASTM E84 standard, and
 heat isolation to fire guaranteeing a temperature of the underlying substrate not higher than 427° C.

It will be noted that the panels of the invention had the advantage of being transparent to hyper-frequencies, including the specific frequency of water (between 1,000 and 1,100 MHz) and of being easily repairable.

A coating structure according to the invention of a wall intended to give said wall heat insulation relatively to cryogenic fluids and/or a protection against fire and flames and/or a seal to these fluids, the structure being in particular adapted for coating a platform, a bridge or hull of an offshore liquefied gas production floating unit, is such that the structure comprises an assembly of said panels intended to be attached to the wall, the panels being connected together through leak-proof junction means comprising preferably composite cords based on short basalt fibers impregnated with a cellular thermosetting matrix either identical or different from that of the panels.

It will be noted that the coating structures according to the invention may relate to the coating of any wall or underlying substrate, whether this wall is for example horizontal (structure then forms a paving formed with an assembly of slabs for example polygonal slabs), vertical or other, and that these structures may for example protect walls such as walls or partitions against fires. Alternatively, these structures may protect buildings, industrial apparatuses (including thermally insulated conduits or cryogenic tanks), and land, railway, sea, river, airborne or space vehicles.

A manufacturing method according to the invention of a said panel according to the invention is such that it comprises the following successive steps:

a) needling of said superposed non-woven fabrics of said at least one support in said superposition thickness without providing any thermoplastic fibers, preferably with provision of continuous basalt fibers, b) impregnation with said matrix of the needled non-woven fabrics, c) calendering of said impregnated non-woven fabrics, d) drying said impregnated and calendered non-woven fabrics, and then e) pressing said impregnated, calendered non-woven fabrics and dried between heating plates with a controlled gap.

Figure 2:
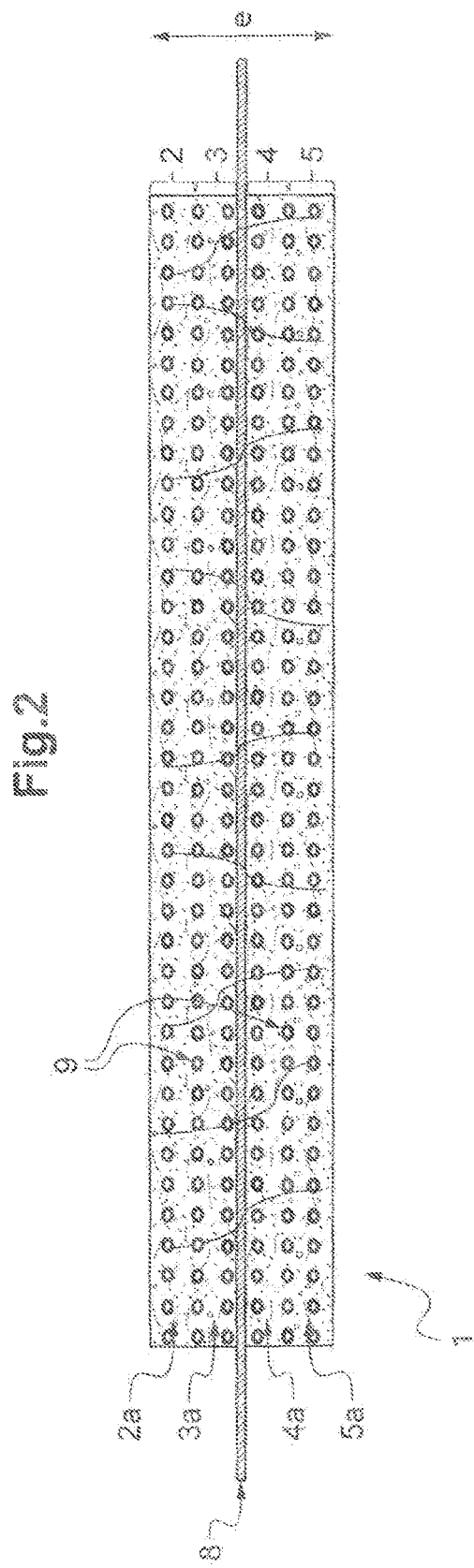
Figure 3:
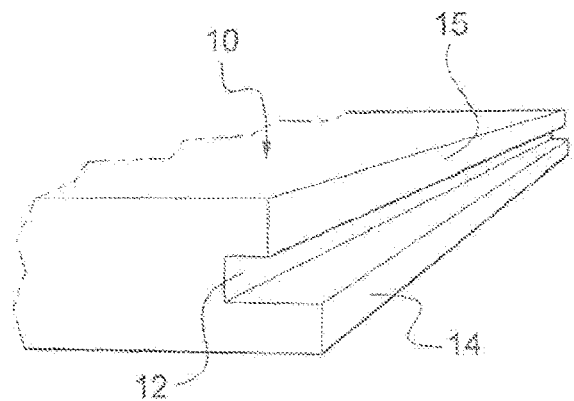
Figure 4:
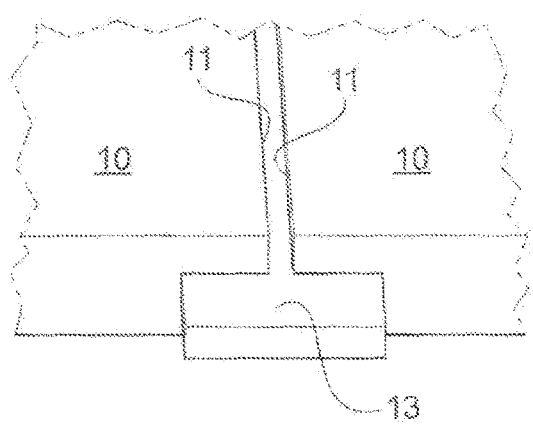
Figure 5:
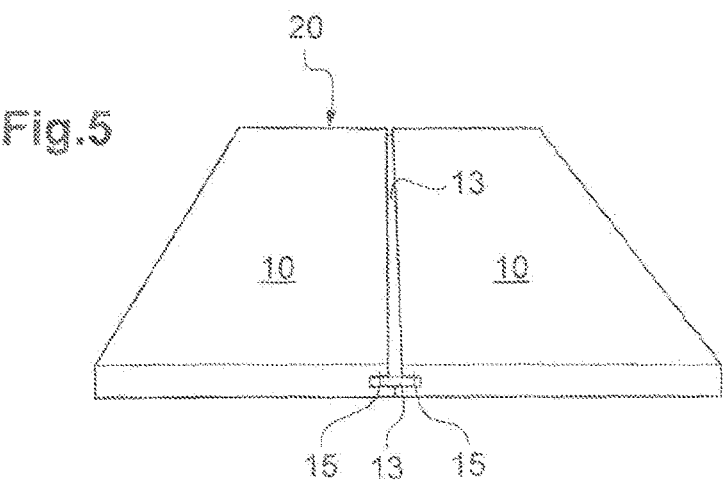

Other features, advantages and details of the present invention will become apparent from the reading of the following description of several exemplary embodiments of the invention, given as an illustration and not as a limitation, the description being made with reference to the appended drawings, wherein:

FIG. 1 is a schematic partial view as a cross-section of a support included in a panel according to an example of the invention compliant with said first embodiment, showing the application of the needling applied to the support before its impregnation with the thermosetting matrix, FIG. 2 is a partial schematic view as a cross-section of the support of FIG. 1, needled and impregnated with the matrix, FIG. 3 is a perspective partial view of a panel according to the invention showing a grooved longitudinal edge of this panel intended to receive a junction means with another panel, FIG. 4 is a perspective partial view of detail showing the edge of the panel of FIG. 3 assembled with that of another panel by interposition of this junction means, and FIG. 5 is an enlarged top and perspective partial view of the assembly of FIG. 4.

The support 1 according to the example of the invention visible during manufacturing in FIG. 1 comprises four non-woven fabrics 2, 3, 4, 5 superposed for example of the felt type which, illustrated before their needling with tools 6 and 7 provided with needles 6a and 7a, in majority or exclusively consist of short basalt fibers 2a, 3a, 4a, 5a substantially of the "TBF" type. Preferably, the fibers 2a, 3a, 4a, 5a may advantageously have an average diameter of about 13 μm and an average length of about 40 mm.

In the example of FIG. 1, the fibers 2a, 3a, 4a, 5a are illustrated in a purely somatic way, it being specified that a more or less random orientation of the fibers 2a-5a may also be contemplated for each of the non-woven fabrics 2-5.

After needling in depth of the non-woven fabrics 2-5 obtained by alternating movements of the tools 6 and 7 in the direction of the double arrows A so that the needles 6a and 7a each cross the total thickness of superposition of the non-woven fabrics 2-5 with provision, according to this first embodiment, of long fibers (i.e. substantially continuous fibers) of basalt of the "BCF" class in order to form warp yarns 8, the needled support partly visible in FIG. 1 was obtained and completed in FIG. 2 with insertion of continuous basalt warp yarns 8 (a single one is visible in these figures) according to gaps between consecutive warp yarns 8 comprised between 10 cm and 40 cm and advantageously of the order of 20 cm. As provided fibers of the "BCF" type used for this needling, yarns with a titer of less than or equal to 230 tex and preferably equal to 180 tex were advantageously used, these long or continuous yarns having an average diameter comprised between 6 μm and 21 μm.

The surface mass or basis weight of the stack of needled non-woven fabrics 2-5 via continuous fibers 8 is advantageously comprised between 480 and 1,000 g/m² by including 780 g/m², it being specified that in this embodiment of FIG. 2, the non-woven fabrics 2-5 superposed over a thickness e consist of basalt fibers, comprising short fibers 2a-5a as a majority and continuous yarns 8 as a minority (by mass).

As indicated earlier in the general discussion of the present invention, it will be noted that it is alternatively possible to produce this needling of the non-woven fabrics 2-5 without providing any fibers, these non-woven fabrics 2-5 then exclusively consisting of the sole short basalt fibers 2a-5a.

Subsequently to this needling, the non-woven fabrics 2-5 were impregnated with a thermosetting matrix 9 based (i.e. in majority made up by mass) on a thermosetting resin in an aqueous base preferably consisting of a melamine-formaldehyde copolymer (with a mass content of formaldehydes of the order of $0.2.10^{-1}$% only).

Table 1 hereafter details an example of a formulation tested for the support 1 consisting of needled non-woven fabrics 2-5 and for the composition of the thermosetting matrix 9 impregnating this support 1.

TABLE 1

| Ingredients | Mass fraction in the whole of the support 1 and of the matrix 9 |
|---|---|
| Non-woven support 1 | 20 |
| Thermosetting matrix 9 | 80 |
| Melamine-formaldehyde resin | 45 |
| Expansion agent (isobutane) | 3 |
| Catalyst (amine hydrochloride) | 1 |
| Water | 31 |

In order to manufacture composite panels 10 according to the invention from the non-woven support 1 impregnated with this matrix 9, one proceeded as follows, according to an exemplary embodiment of the invention.

In a first step, one proceeded with the calendering of the support 1 impregnated with the matrix 9 for controlling the relative proportion between this support 1 and this matrix 9.

In a second step, one proceeded with the drying of the support 1 impregnated with the matrix 9 and calendered as follows:

Evaporation of a portion of the water from the support 1 for 2 hours;
Condensation of the evaporated water for 2 hours;
Continuous discharge of the condensed water; and then
Repeating these two evaporation and condensation cycles for a period ranging from 24 hours to 48 hours.

In a third step, it was proceeded with the pressing of the support 1 in the dry condition, between two heated plates with controlled gap, as follows:

cycle of 8 minutes at 120° C. with a force of 300 kN on the plates;
cycle of 30 seconds at 0 kN (decompression);
cycle of 7 minutes at 120° C. with a force of 300 kN on the plates; and then
cooling the product on a flat surface for 30 minutes.

It will be noted that it is conceivable, within the scope of the method for manufacturing a panel 10 according to the invention, of pressing:

one or several non-woven supports 1 together in a same cycle, or else alternatively
n supports 1 one after the other (i.e. in n cycles), which n integer inclusively comprised between 2 and 5 (in this case, the different supports 1 may have the same thickness or pitch).

Thus composite panels 10 according to the invention were thereby obtained which were each formed with a rectangular slab, as illustrated in FIGS. 3 and 5, it being specified that it is possible alternatively to obtain panels 10 with a square geometry or otherwise polygonal geometry. The maximum surface areas obtained for these panels 10 of the invention, which were limited to the surfaces of the presses used, were in these exemplary embodiments comprised between 0.5 $m^2$ and 6 $m^2$. Further, these panels 10 each had a specific gravity which was comprised between 60 kg/$m^3$ and 1,200 kg/$m^3$ and which may either vary or not at the surface of each panel 10, for a panel thickness 10 comprised between 5 mm and 30 mm.

The panels 10 were subject to the aforementioned tests, notably with results obtained as a heat conductivity at 25° C. of less than or equal to 35 mW·$m^{-1}$$K^{-1}$, a seal to cryogenic fluids and a passive resistance to fire, all satisfactory (measured by said inflammability, said resistance to propagation of flames, said emissivity index of fumes and said thermal insulation to fire).

As illustrated in FIGS. 3 to 5, in each of the two longitudinal edges 11 of each panel 10 a longitudinal groove 12 was made receiving a composite leak-proof junction cord 13 for obtaining a coating structure 20 of a wall according to the invention.

Each cord 13 was based on the same short basal fibers as the ones 2a-5a of the non-woven fabrics 2-5 impregnated with the same cellular thermosetting matrix as the matrix 9 having been used for impregnation of the non-woven fabrics 2-5 (it being specified that alternatively a cellular composite cord 13 based on a support and/or on an impregnation matrix other than those of each panel 10 may be used).

In the example of FIGS. 3 to 5, each groove 12 has an asymmetrical U cross-section, i.e. delimited by an edge 14 (lower edge on these figures) wider than the other edge 15 (upper edge in these figures), so that during the abutment of two panels 10 in a same plane with the two edges of the grooves 12 positioned facing each other, the wider lower edges 14 are substantially in abutment against each other and the less wide upper edges 15 are spaced apart from each other. Each junction cord 13 thus has cross-sectionally substantially a T-shape (i.e. an inverted T, the apex of which fills both grooves 12 facing it and for which the legs extend continuously this apex between the two upper edges 15 spaced apart over the whole length of the panels 10 while being flush with the adjacent surfaces of the panels 10).

It will be noted that it is thus possible to obtain a modular coating structure 20 with variable surface area which is adapted to that of the underlying wall to be protected.

The invention claimed is:

1. A composite panel with a cellular thermosetting matrix, the panel comprising at least one support impregnated with said matrix and which comprises several non-woven fabrics superposed along a superposition thickness, said non-woven fabrics each comprising non-woven short basalt fibers and being needled in said thickness without provision of thermoplastic fibers.

2. The panel according to claim 1, characterized in that said several superposed non-woven fabrics comprise at least three said non-woven fabrics.

3. The panel according to claim 1, characterized in that said superposed non-woven fabrics are needled with provision of continuous basalt fibers forming parallel warp yarns inserted into said supersposed non-woven fabrics.

4. The panel according to claim 3, characterized in that said warp yarns are spaced apart two by two by a distance comprised between 10 cm and 40 cm.

5. The panel according to claim 4, characterized in that said continuous basal fibers have a linear mass comprised between 100 tex and 300 tex.

6. The panel according to claim 3, characterized in that said superposed non-woven fabrics each consist of said short basalt fibers and said continuous basalt fibers.

7. The panel according to claim 1, characterized in that said superposed non-woven fabrics each have a surface mass comprised between 480 g/$m^2$ and 2,000 g/$m^2$.

8. The panel according to claim 1, characterized in that said superposed non-woven fabrics each have a surface mass greater than 1,000 g/$m^2$ and are needled without providing any continuous basalt fibers, so that said superposed non-woven fabrics each consist of said short basalt fibers.

9. The panel according to claim 1, characterized in that said short basalt fibers have an average diameter comprised between 13 µm and 16 µm and an average length comprised between 30 mm and 60 mm.

10. The panel according to claim 1, characterized in that said at least one support impregnated with said thermosetting matrix comprises said superposed non-woven fabrics according to a mass fraction comprised between 15 and 25% and said matrix with a mass fraction comprised between 75 and 85%.

11. The panel according to claim 1, characterized in that said thermosetting matrix comprises:

according to a mass fraction comprised between 50 and 65%, a resin in an aqueous base selected from the group formed by melamine-formaldehyde resins, phenolic resins and wood glues;
according to a mass fraction comprised between 3 and 15%, an expansion agent for forming open;
according to a mass fraction comprised between 0.5 and 2%, a catalyst; and
according to a mass fraction comprised between 30 and 45%, an aqueous solvent such as water.

12. The panel according to claim 1, characterized in that said superposed non-woven fabrics impregnated with said thermosetting matrix have a specific gravity comprised between 60 kg/m³ and 1,200 kg/m³ and a thickness comprised between 5 mm and 30 mm.

13. The panel according to claim 1, characterized in that the panel further comprises:
- at least one aluminium sheet located on the outside of said superposed non-woven fabrics of said at least one support, or
- an external layer forming a protective coating of the panel which is selected from the group formed by rubbers, thermoplastic elastomers, epoxy paints and polyurethanes.

14. The panel according to claim 1, characterized in that the panel has a heat conductivity of less than or equal to 50 mW·m⁻¹·K⁻¹.

15. The panel according to claim 1, characterized in that the panel has a seal to cryogenic fluids.

16. The panel according to claim 1, characterized in that the panel has a resistance to fire and to flames.

17. The panel according to claim 4, characterized in that said continuous basalt fibers have a linear mass comprised between 100 tex and 300 tex and fit the name of basalt continuous fibers (BCF).

18. The panel according to claim 11, wherein said catalyst comprises an amine hypochloride.

19. The panel according to claim 11, wherein said expansion agent for forming open cells comprises isobutene or isopentane.

20. The panel according to claim 11, wherein said resin in an aqueous base is a phenolic resin.

21. The panel according to claim 14, characterized in that the panel has a seal to cryogenic fluids.

22. The panel according to claim 14, characterized in that the panel has a resistance to fire and to flames.

23. A coating structure of a wall intended to give said wall heat insulation towards cryogenic fluids and/or a protection against fire and flames and/or a seal towards said cryogenic fluids, the structure being in particular adapted for coating a platform, a bridge or a hull of an offshore liquefied gas production floating unit,
characterized in that the structure comprises an assembly of panels according to claim 1, which is intended to be attached to said wall, the panels being connected together through sealed junction means preferably comprising composite cords based on short basalt fibers impregnated with a cellular thermosetting matrix either identical or different from those of said panels.

24. A method for manufacturing a panel according to claim 1, characterized in that the method comprises the following successive steps:
a) needling of said superposed non-woven fabrics of said at least one support in said superposition thickness without providing any thermoplastic fibers, preferably with a provision of continuous basalt fibers,
b) impregnation with said thermosetting matrix of said superposed and needled non-woven fabrics,
c) calendering of said impregnated non-woven fabrics,
d) drying of said impregnated and calendered non-woven fabrics, and then
e) pressing said impregnated, calendered non-woven fabrics and dried between heated plates with a controlled gap.

* * * * *